Figure 1:
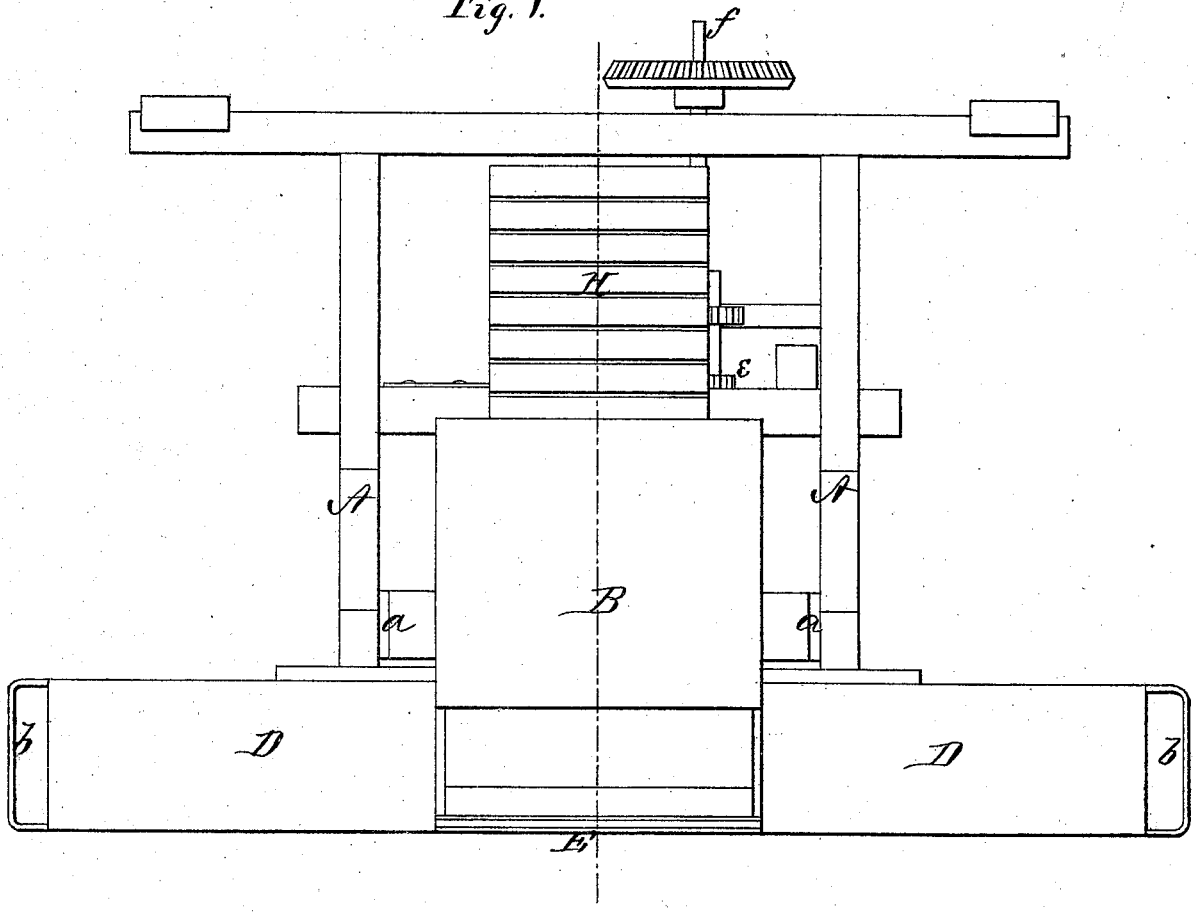

2 Sheets--Sheet 1.

L. GAUNTT.
Cotton and Hay Presses.

No. 150,656. Patented May 5, 1874.

Witnesses.
Chas. B. Steele
George E. Upham.

Inventor
Lafayette Gauntt
Chipman Hosmer &
Atty

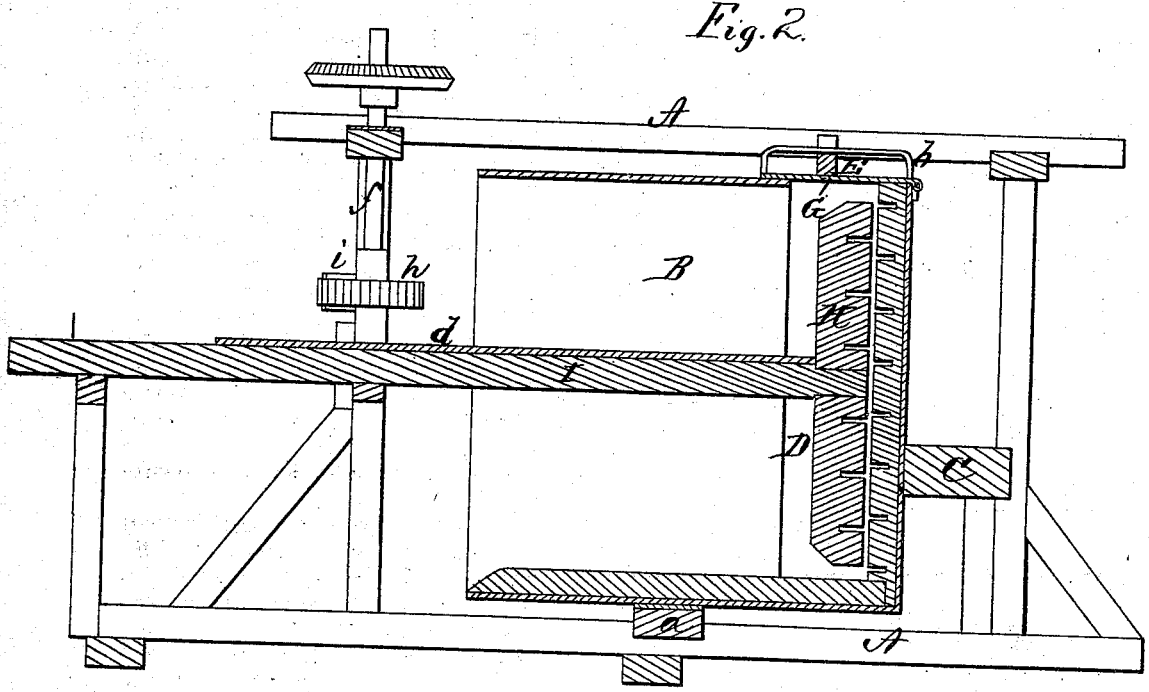

UNITED STATES PATENT OFFICE.

LAFAYETTE GAUNTT, OF CAMILLA, GEORGIA.

IMPROVEMENT IN COTTON AND HAY PRESSES.

Specification forming part of Letters Patent No. 150,656, dated May 5, 1874; application filed July 19, 1873.

*To all whom it may concern:*

Be it known that I, LAFAYETTE GAUNTT, of Camilla, in the county of Mitchell and State of Georgia, have invented a new and valuable Improvement in Cotton and Hay Presses; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my press in front elevation, the bale-box being thrown down and opened. Fig. 2 is a longitudinal vertical section of the press in position for work.

The nature of my invention consists in the construction and arrangement of a cotton and hay press, having a pivoted bale-box and horizontally-operating follower, as will be hereinafter more fully set forth.

In the accompanying drawings, like letters of reference indicate corresponding parts.

A represents the frame-work of my press, which may be constructed in any suitable manner to contain the working-parts, and may be mounted upon wheels, if so desired. B represents the bale-box, which is hung upon trunnions $a$ $a$, and, when thrown in a horizontal position for pressing, is held and supported by a bar, C, against the bottom. By taking out this bar, and removing the follower-block to a certain point, the box may be tilted to an upright position for packing. The sides of the box B, at the bottom, have hinged doors D D, which are to be opened after the bale is pressed, and then the ties can readily be put around the bale. These doors D D are provided with loops $b$ $b$ at the ends, which are uppermost when the box is in a horizontal position; and through these loops is passed a hooked bar, E, for locking the doors while packing and pressing. The bar E also holds an end door, G, of the box closed. After the bale is pressed and tied, as above mentioned, the box is turned on its trunnions to an upright position, when the bale is readily removed. H represents the follower-block attached to a horizontal bar, I, which moves in suitable guides on the frame A, and is provided with a rack-bar, $d$. This rack-bar gears with a pinion, $e$, on an upright shaft, $f$, which may be operated by means of a lever, or by suitable gearing, as desired. On the shaft $f$ is a ratchet-wheel, $h$; and a pawl, $i$, attached to the frame A, works in said ratchet-wheel to hold the follower from moving backward as it is moved inward into the box.

What I claim as new, and desire to secure by Letters Patent, is—

1. The bale-box B, provided with hinged doors D D and G, said doors being locked by means of the hooked bar E in the loops $b$ $b$ on the doors D D, substantially as and for the purposes herein set forth.

2. The frame A, pivoted bale-box B, with doors D D and G, bar E, and loops $b$ $b$, the bar C, follower H, bar I, with rack-bar $d$ and pinion $e$ on the shaft $f$, all combined as and for the purposes herein set forth.

In testimony that I claim the above I have hereunto subscribed my name in the presence of two witnesses.

LAFAYETTE GAUNTT.

Witnesses:
A. F. SCOTT,
MICHAEL REDDY.